April 30, 1963 J. R. GATELY 3,088,053
RELAY CONTROL CIRCUIT
Filed May 11, 1960
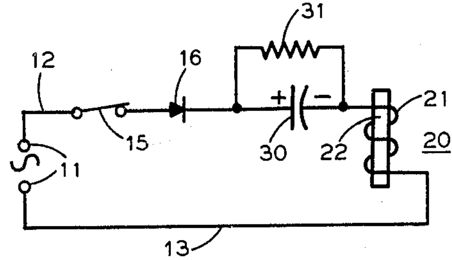
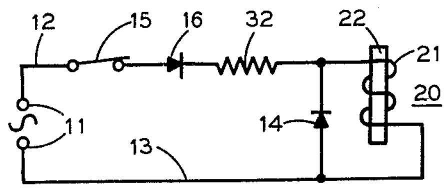
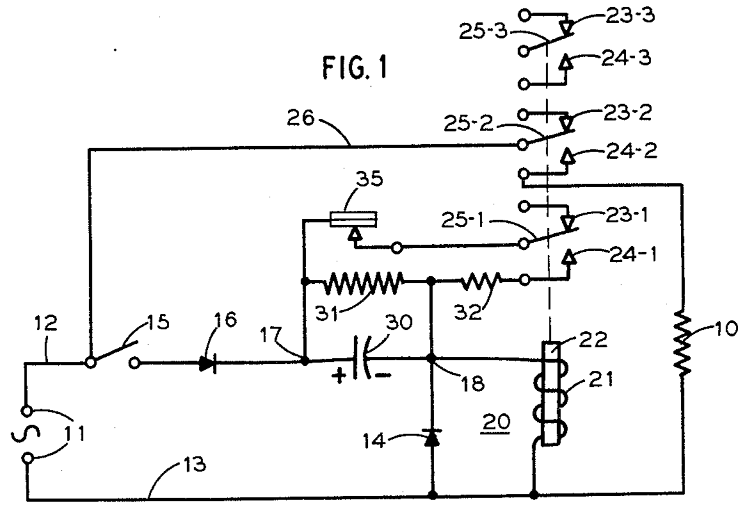
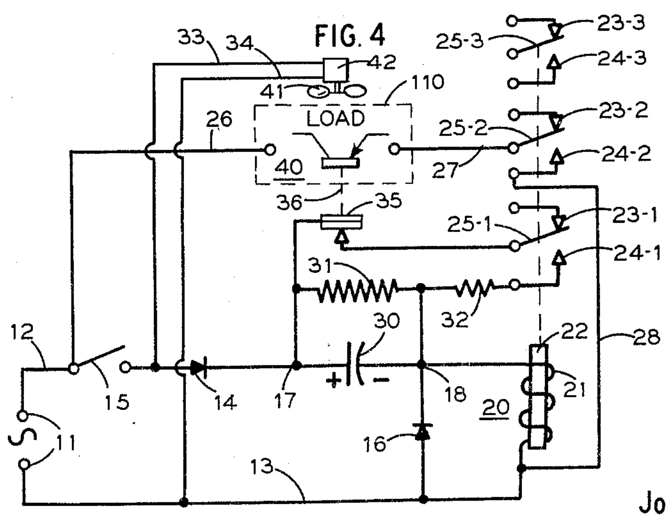
INVENTOR.
Joseph R. Gately
BY Blum, Moscowitz, Friedman & Blum
ATTORNEYS United States Patent Office 3,088,053 Patented Apr. 30, 1963

3,088,053

RELAY CONTROL CIRCUIT

Joseph R. Gately, Woodside, N.Y., assignor to Forbro Design Corp., New York, N.Y., a corporation of New York Filed May 11, 1960, Ser. No. 28,389
9 Claims. (Cl. 317—40)

This invention relates to thermal overload protection for power consuming apparatus and, more particularly, to a novel relay control circuit for such thermal overload protection.

Various arrangements have been proposed for heat or thermal overload protection for power consuming apparatus. Generally, these arrangements include a master or control relay which is operated responsive to closing of a thermostatic switch.

Among the desirable characteristics which such control or protection arrangements should possess are the assurance of absolute reliability in operation, the assurance of discontinuance of the supply of power to the load when the latter, or one or more of its components, are dangerously overheated, and the provision of adequate cooling for the component or components of the load most subject to overheating.

A particularly efficient and reliable control circuit, possessing these characteristics to a large degree, is illustrated and described in the co-pending application of Aaron Rosenfeld et al., Serial No. 752,596, filed August 1, 1958, now Patent No. 3,056,905 for "Protective System for Transistors." The arrangement shown in said co-pending application is particularly designed to prevent excessive heating of the main or pass transistor of a transistorized power supply, this being the transistor most subject to overheating. The disclosed arrangement includes a motor driven fan which is energized, whenever the main input switch is closed, to connect the system to a source of alternating current, this fan being adapted to direct a flow of cooling air onto the pass transistor at all times when the main switch is closed. A thermostatic switch is arranged in heat conductive relation with the pass transistor, and is designed to close whenever the temperature of the pass transistor exceeds a predetermined value. Closure of this thermostatic switch energizes a relay which opens the power supply circuit to the pass transistor. The relay also closes a holding circuit, when it is energized by closure of the thermostatic switch, and power cannot again be supplied to the pass transistor until the main control switch has been reopened and reclosed.

However, the motor driven fan continues to operate, even though power is not supplied to the main transistor, as long as the main switch is closed, and thus effectively cools the pass transistor to below the danger temperature. Should the main switch be opened and then reclosed to re-set the apparatus, and should the temperature of the pass transistor still be a value such that the thermostatic switch remains closed, the relay will immediately be re-energized and held transferred by the holding circuit, and thus prevent the supply of current to the pass transistor. This condition will continue to occur, each time the main switch is opened and reclosed, until such time as the pass transistor has cooled to a value such that the thermostatic switch opens.

While this system has many very desirable advantages and is very efficient in operation, it nevertheless has some operational disadvantages. Among the latter is the fact that the entire load current is carried through the main switch, and thus the latter must be a relatively heavy construction. In addition, the thermostatic switch is normally open and thus subject to oxidization of its contacts. Consequently, upon occurrence of a thermal overload, effective operation of the relay may be inhibited due to oxidation of the contacts of the thermostatic switch. When it is appreciated that such a protective arrangement operates only very infrequently, it will be understood wherein the problem of oxidization of contacts becomes very serious.

Furthermore, the relay is normally in the deenergized condition, and is energized only upon the occurrence of a thermal overload. Thus, there is a possibility that the relay will not "fail safe" and, when the relay is energized, the normally open contacts may have been oxidized and thus prevent proper operation of the system. Considering these factors, it will be appreciated that a better system could be provided if one could be devised to utilize a normally closed relay.

The present invention provides such a system in a novel manner. More particularly, the relay control system of the present invention includes a relay circuit control switch which does not carry the main load current and therefore may be of relatively light construction. The relay energizing winding is in series with a condenser and a diode and has a pick-up current characteristic such that, when the control switch for the relay circuit is closed, the charging current for the condenser will be of a sufficient value to effect energization of the relay. A relatively large resistance is in shunt with the condenser, but has no effect upon energizing of the relay. When the relay is energized (or transferred), it closes a shunt circuit around this condenser and its associated resistance, this shunt circuit including a relatively low value resistance and a normally closed thermostatic switch. The reduced flow of current through the relatively low value resistance is sufficient to keep the relay energized, while the resistance limits the flow of current through the relay winding. The condenser now discharges through the relatively small resistance.

Upon occurrence of a thermal overload, the normally closed thermostatic switch opens. The condenser will immediately recharge but, since the relay is already energized, there will be no effect upon the relay until such time as the charging current through the condenser drops off as the condenser nears the full charge condition. At this time, the corresponding drop off in the current through the relay winding will result in the relay opening its contacts to cut off the main power supply. Means, including a diode in shunt with the relay winding, are also provided for preventing chatter of the relay, as the first mentioned diode, acting as a half-wave rectifier, blocks passage of the negative half cycle of the alternating current. The current through the second diode is that provided by the decay of the magnetic flux in the relay winding during the negative half cycle of the A.C. supply.

For an understanding of the principles of the invention, reference is made to the following description of typical embodiments thereof as illustrated in the accompanying drawings. In the drawings:

FIG. 1 is a schematic wiring diagram of a thermal protection relay control circuit embodying the invention;

FIG. 2 is a schematic wiring diagram of the equivalent relay energizing circuit;

FIG. 3 is a schematic wiring diagram of the equivalent relay holding circuit; and FIG. 4 is a schematic wiring diagram of the relay control system as applied to thermal protection of a transistorized power supply.

Referring to FIG. 1 of the drawing, the relay control circuit is illustrated as controlling the supply of power from a pair of input terminals 11, connected to a suitable source of alternating current, to a power consuming load indicated schematically by the impedance or resistance 10. A conductor 12 connects one terminal 11 to a main control switch 15, and a conductor 13 connects the other terminal 11 to one terminal of the load 10. A diode 16 is connected between switch 15 and junction point 17, and a condenser 30 is connected between junction point 17 and a junction point 18. This latter junction point is connected to one end of winding 21 of a relay 20 having a core 22, and the opposite end of winding 21 is connected to conductor 13. A second diode 14 is connected between conductor 13 and junction point 18, in shunt with winding 21.

Relay 20 has a plurality of movable armatures, including armatures 25–1, 25–2, and 25–3. When winding 21 is de-energized, as when switch 15 is open, armatures 25 respectively engage upper or "normal" contacts 23–1, 23–2, and 23–3 of relay 20. When winding 21 is energized, as by closure of switch 15, relay armatures 25 engage lower or "transferred" contacts 24–1, 24–2, and 24–3.

A relatively large, low power drain resistor 31 is effectively connected between junction points 17 and 18 in parallel with condenser 30, and a relatively small high power drain resistor 32 is effectively connected between junction point 18 and contact 24–1 of relay 20. Armature 25–1 is connected to a normally closed thermostatic switch 35, such as a bimetallic switch, whose other terminal is connected effectively to junction point 17. By "normally closed" is meant closed below the safe operating temperature limit of the protected equipment, and open when this safe temperature limit is exceeded. Contact 24–2 is connected to the other terminal of load 10, and a conductor 26 connects armature 25–2 to conductor 12 in advance of switch 15. The third armature 25–3, and its associated contacts 23–3 and 24–3, may control a suitable auxiliary circuit.

The described relay control circuit operates in the following manner. When switch 15 is closed, the line potential at input terminals 11, 11 is applied across a series circuit comprising diode 16, condenser 30, and winding 21 of relay 20. Diode 16 rectifies the alternating current for charging of condenser 30 to the polarity shown. The charging current of condenser 30, flowing through the relay winding 21, is sufficient to effectively energize this winding to operate relay 20 to transfer armatures 25 from upper contacts 23 to lower contacts 24. This charging circuit is schematically illustrated in FIG. 2.

When the relay 20 is thus transferred, with armature 25–1 engaging contact 24–1, condenser 30 and resistance 31 are effectively shunted by a series circuit including resistor 32 and normally closed thermostatic switch 35. The effective holding or energization maintaining circuit for relay winding 21 is now as illustrated in FIG. 3. The diode 14 prevents relay chatter by providing for current to flow through coil 21 during the negative half cycle of alternating current when diode 16 is not conducting. The current through diode 14 flows as a result of the collapse of the magnetic flux in coil 21 of relay 20.

The value of resistor 32 is so selected as to limit the current flow through relay coil 21 to a desired holding value, and the voltage across condenser 30 is maintained at a low value equal to the voltage drop across resistor 32 in series with thermostatic switch 35. Condenser 30 discharges to this low value through resistance 32.

Should thermostatic switch 35 open, due to a thermal overload or due to heating of a protected component of the load of a temperature in excess of its safe operating temperature, the shunt will be removed from condenser 30 and the latter will immediately re-charge with a relatively large current flow through the relay coil 21. However, since relay 20 is already transferred, there will be no relay action until condenser 30 is nearly fully charged. At this latter time, as the charging current of condenser 30 begins to decrease, the current flowing through the coil 21 will become insufficient to maintain the relay 20 transferred and the relay armatures 25 will disengage contacts 24 and re-engage contacts 23. The effective circuit is now as shown in FIG. 2. The current flow through resistance 31 is too small to affect the operation of relay 20.

To re-activate relay 20, switch 15 is opened, allowing condenser 30 to discharge through resistance 31. When switch 15 is re-closed, condenser 30 will again charge through coil 21 and thereby transfer relay 20. If the thermostatic switch 35 has cooled to an extent such that it is closed, the relay will remain transferred as previously described. However, if switch 35 is still open, relay 20 will not remain transferred because the current flowing through the coil 21 will become insufficient to maintain relay 20 transferred, and the relay armatures 25 thus will disengage contacts 24 and re-engage contacts 23. The relay armatures 25 will not remain transferred unless thermostatic switch 35 is closed before switch 15 is opened and then reclosed.

In a typical practical example, resistor 31 may have a value of 82,000 ohms and a heat dissipation rating of 0.5 watt, resistor 32 may have a value of 1,000 ohms and a heat dissipation rating of 5 watts, condenser 30 may have a capacity of 10 mf., and the resistance of coil 21 may be of the order of 2,000 ohms. Under these conditions, the drop-out time of relay 20 is less than one (1) second, and the charging time of condenser 30 is of the order of four (4) seconds.

FIG. 4 illustrates the relay control circuit of the invention as applied to a protective system for a transistorized regulated output voltage power supply of the type shown in said co-pending application Serial No. 752,596, now Patent No. 3,056,905. The load, represented in this case by a transistorized regulated output voltage power supply, is connected between relay armature 25–2 and input terminal 11 by means of the conductors 26 and 27. The load is schematically illustrated as including an output or pass transistor 40. A conductor 28 connects conductor 13 to contact 24–2 of relay 20. In this case, thermostatic switch 35 is illustrated as being in direct heat conducting relationship with transistor 40, the heat conducting connection being schematically illustrated by the dotted line 36.

Pass transistor 40 is illustrated as having associated therewith a fan 41 driven by a motor 42, and arranged to blow cooling air over the pass transistor. A conductor 33 connects one terminal of motor 42 to switch 15, and a conductor 34 connects the other motor terminal to conductor 13. By virtue of this connection, motor 42 is energized to drive fan 41 whenever switch 15 is closed, and remains energized irrespective of whether or not relay 20 is transferred. Thus, there is always a flow of cooling air over the pass transistor 40 whenever switch 15 is closed.

The arrangement shown in FIG. 4, insofar as the relay control circuit is concerned, operates in a manner identical with the operation of the circuit shown in FIG. 1. The only difference is that motor 42 remains energized at all times when switch 15 is closed, to drive fan 41 to provide a flow of cooling air over the pass transistor 40 even though the latter may be disconnected from input terminals 11, 11 due to armature 25–2 of relay 20 disengaging contact 24–2.

As mentioned above, the improved relay control circuit of the present invention provides for the use of a normally closed thermostatic switch 35. By using a normally closed thermostatic switch, shut down on overload cannot be prevented by oxidized contacts. Also, as relay 20 is energized or transferred during normal operation, neither relay failure nor oxidization of the relay contacts can prevent opening of the main power or load circuit on an excessive rise in temperature. Failure of any component of the circuit will prevent normal operation. In other words, the control circuit "fails safe."

No additional control wires are required as compared to the protective system described and shown in said application Serial No. 752,596. The control circuit may be controlled by a power line switch located remotely or at any point in the alternating current supply circuit. As the switch 15 need not carry the main load current, a very light switch may be used. Also, no re-set button or other control device is required, as the control circuit may be re-set by simply opening switch 15 and reclosing this switch.

The relay control circuit is operative on any line frequencies, from 50–500 cycles, and the heavy direct current pulse which energizes relay 20 during charging of condenser 30 assures very rapid relay closures. This minimizes contact pitting on heavy loads.

In previous power supplies, the on-off power switch has been a DPDT relay. One set of contacts was used to energize and deenergize the power circuits, while the other set was used to short the unregulated supply filter condenser through a suitable resistor when the switch was turned to "Off." This had the disadvantage that, if the switch was left in the "On" position and the input voltage to the power supply was controlled from a remote switch, the discharge of this input capacitor on remote turn-off would not occur and would possibly create an overshoot in the output voltage of the power supply. In order to avoid this difficulty, it was necessary to put in an additional relay which was energized by the line voltage, and whose contacts were in parallel with one-half of the DPDT switch.

In the present invention it is not necessary to have this additional relay, because disconnection of the A.C. input from a remote point will deenergize the relay, and the third set of contacts will discharge such filter condenser through a low resistance.

While specific embodiments of the invention have been shown and described in detail to illustrate the application of the principles of the invention, it will be understood that the invention may be embodied otherwise without departing from such principles.

What is claimed is:

1. A thermal protection system for electric power consuming apparatus comprising, in combination, a relay having an energizing winding and first normally open contacts controlling supply of electric potential from a source thereof to said apparatus; an energizing circuit for said relay winding including a control switch and a condenser connected in series between said source and said relay winding, the charging current of said condenser being of a value sufficient to energize said winding to transfer said relay to close its normally open contacts; the current flow through said relay winding and said condenser, except during charging of the latter, being insufficient to maintain said relay transferred; and a holding circuit for said relay including a normally closed thermostatic switch, in series with second normally open contacts of said relay and said relay winding, and in shunt with said condenser; said thermostatic switch opening when the temperature of said apparatus exceeds a pre-set value; said condenser discharging when said holding circuit is closed; whereby, when said control switch is closed with said thermostatic switch closed, said relay will be transferred to connect said apparatus to said source; said relay, upon opening of said thermostatic switch, remaining transferred during the re-charging of said condenser and said relay coil being de-energized to drop said relay to open its normally open contacts as said condenser approaches full charge.

2. A thermal protection system for electric power consuming apparatus comprising, in combination, a relay having an energizing winding and first normally open contacts controlling supply of the electric potential from a source thereof to said apparatus; an energizing circuit for said relay winding including a control switch and a condenser connected in series between said source and said relay winding; a relatively large resistance in shunt with said condenser and ineffective during charging of the latter; the charging current of said condenser being of a value sufficient to energize said winding to transfer said relay to close its normally open contacts; the current flow through said relay winding and said condenser, except during charging of the latter, being insufficient to maintain said relay transferred; a holding circuit for said relay including a normally closed thermostatic switch, in series with second normally open contacts of said relay and said relay winding, and in shunt with said condenser and said relatively large resistance; said thermostatic switch opening when the temperature of said apparatus exceeds a pre-set value; said condenser discharging through said relatively large resistance when said holding circuit is closed; whereby, when said control switch is closed, with said thermostatic switch closed, said relay will be transferred to connect said apparatus to said source; said relay, upon opening of said thermostatic switch, remaining transferred during re-charging of said condenser and said relay winding being de-energized to drop said relay to open its normally open contacts as said condenser approaches full charge.

3. A thermal protection system for electric power consuming apparatus comprising, in combination, a relay having an energizing winding and first normally open contacts controlling supply of electric potential from a source thereof to said apparatus; an energizing circuit for said relay winding including a control switch and a condenser connected in series between said source and said relay winding, the charging current of said condenser being of a value sufficient to energize said winding to transfer said relay and the current flow through said relay winding and said condenser, except during charging of the latter, being insufficient to maintain said relay transferred; a holding circuit for said relay including a normally closed thermostatic switch and a relatively small resistance, in series with second normally open contacts of said relay and said relay winding, and in shunt with said condenser; said thermostatic switch opening when the temperature of said apparatus exceeds a pre-set value; said condenser discharging when said holding circuit is closed; whereby, when said control switch is closed with said thermostatic switch closed, said relay will be transferred to connect said apparatus to said source; said relay, upon opening of said thermostatic switch, remaining transferred only during re-charging of said condenser and said relay winding being de-energized to drop said relay to open the normally open contacts of said relay as said condenser approaches full charge; said relatively small resistance limiting the current flow through said relay winding while said relay is transferred.

4. A thermal protection system for electric power consuming apparatus comprising, in combination, a relay having an energizing winding and first normally open contacts controlling supply of electric potential from a source thereof to said apparatus; an energizing circuit for said relay winding including a control switch and a condenser connected in series between said source and said relay winding, the charging current of said condenser being of a value sufficient to energize said winding to transfer said relay to close its normally open contacts; the current flow through said relay winding and said condenser, except during charging of the latter, being insufficient to maintain said relay transferred; a relatively large resistance in shunt with said condenser and ineffective during charging of the latter; a holding circuit for said relay including a normally closed thermostatic switch and a relatively small resistance, in series with second normally open contacts of said relay and said relay winding, and in shunt with said condenser and said relatively large resistance; said thermostatic switch opening when the temperature of said apparatus exceeds a pre-set value;

said condenser discharging through said relatively large resistance when said holding circuit is closed; whereby, when said control switch is closed with said thermostatic switch closed, said relay will be transferred to connect said apparatus to said source; said relay upon opening of said thermostatic switch, remaining transferred during recharging of said condenser, and said relay winding being deenergized to drop said relay to open its normally closed contacts as said condenser approaches full charge.

5. A thermal protection system for electric power consuming apparatus comprising, in combination, a relay having an energizing winding and first normally open contacts controlling supply of electric potential from a source of A.C. potential to said apparatus, an energizing circuit for said relay including a control switch, a condenser and a diode connected in series between said source and said relay winding, the charging current of said condenser being of a value sufficient to energize said winding to transfer said relay upon closing said switch, and the current flow through said relay winding and said condenser, except during charging of the latter, being insufficient to maintain said relay transferred; a holding circuit for said relay including a normally closed thermostatic switch, in series with second normally open contacts of said relay and said winding, and in shunt with said condenser; said thermostatic switch opening when the temperature of said apparatus exceeds a pre-set value; said condenser discharging when said holding circuit is closed; whereby, when said control switch is closed with said thermostatic switch closed, said relay will be transferred to connect said apparatus to said source; said relay, upon opening of said thermostatic switch, remaining transferred during recharging of said condenser, and said relay winding being de-energized to drop said relay to open its normally open contacts as said condenser approaches full charge.

6. A thermal protection system for electric power consuming apparatus, as claimed in claim 5, including a relatively large resistance in shunt with said condenser and ineffective during charging of the latter; said holding circuit shunting said relatively large resistance; said condenser discharging through said relatively large resistance when said holding circuit is closed.

7. A thermal protection system for electric power consuming apparatus as claimed in claim 5 including a diode in parallel with said relay winding and effective, when flow of current is blocked during alternate half cycles by said first named diode, to provide for flow of current through said winding, due to decay of the magnetic flux thereof, to prevent chatter of said relay when said holding circuit is closed.

8. A thermal protection system for electric power consuming apparatus, as claimed in claim 5, in which said apparatus includes an output component; and an electric motor energized fan directing a flow of cooling air over said output component; said electric motor being energized whenever said control switch is closed and irrespective of whether or not said relay is transferred or dropped.

9. A thermal protection system for electric power consuming apparatus, as claimed in claim 5, in which said output controlling component comprises a transistor and said thermostatic switch is in heat conducting relation with said transistor.

References Cited in the file of this patent

UNITED STATES PATENTS 2,229,432 Amsden ---------------- Jan. 21, 1941

FOREIGN PATENTS 252,012 Switzerland ------------ Sept. 16, 1948